(12) United States Patent
Calba et al.

(10) Patent No.: US 8,765,216 B2
(45) Date of Patent: Jul. 1, 2014

(54) PROCESS FOR THE MANUFACTURE OF LENSES

(75) Inventors: Pierre-Jean Calba, Charenton le Pont (FR); Joseph Martin, Charenton le Pont (FR); Karin Scherer, Charenton le Pont (FR); Alain Thuillier, Charenton le Pont (FR); Gérard Willemin, Charenton le Pont (FR)

(73) Assignee: Essilor International (Compagnie Generale d'Optique), Paris (FR)

( * ) Notice: Subject to any disclaimer, the term of this patent is extended or adjusted under 35 U.S.C. 154(b) by 61 days.

(21) Appl. No.: 13/490,520

(22) Filed: Jun. 7, 2012

(65) Prior Publication Data
US 2012/0328776 A1    Dec. 27, 2012

(30) Foreign Application Priority Data

Jun. 14, 2011  (FR) ...................... 11 55179

(51) Int. Cl.
*B05D 5/06*  (2006.01)
(52) U.S. Cl.
USPC ........ 427/164; 427/248.1; 427/299; 427/331; 427/377
(58) Field of Classification Search
USPC .................. 427/162, 164, 299, 331, 377
See application file for complete search history.

(56) References Cited

U.S. PATENT DOCUMENTS

| 4,590,117 | A | * | 5/1986 | Taniguchi et al. ............ 428/212 |
| 5,015,523 | A | * | 5/1991 | Kawashima et al. ......... 428/336 |
| 5,619,288 | A | | 4/1997 | White, Jr. et al. |
| 6,858,305 | B2 | | 2/2005 | Degand et al. |
| 7,357,503 | B2 | | 4/2008 | Mosse et al. |
| 2006/0158747 | A1 | | 7/2006 | Kato et al. |
| 2006/0176571 | A1 | | 8/2006 | Mosse et al. |
| 2007/0285599 | A1 | * | 12/2007 | Oxude ............................ 349/99 |
| 2008/0206470 | A1 | | 8/2008 | Thomas et al. |
| 2012/0013845 | A1 | * | 1/2012 | Conte et al. ................... 351/166 |
| 2012/0075705 | A1 | | 3/2012 | Beinat et al. |

FOREIGN PATENT DOCUMENTS

| EP | 0 614 957 A1 | 9/1994 |
| FR | 2 549 968 A1 | 2/1985 |
| FR | 2 903 197 A1 | 1/2008 |
| FR | 2 913 116 A1 | 8/2008 |
| FR | 2 943 798 A1 | 10/2010 |
| WO | WO 02/00561 A2 | 1/2002 |
| WO | WO 2010/109154 A1 | 9/2010 |

OTHER PUBLICATIONS

French Search Report received in corresponding application FR 11 55179.

* cited by examiner

*Primary Examiner* — Elizabeth Burkhart
(74) *Attorney, Agent, or Firm* — Vedder Price P.C.; Thomas Kowalski; Deborah L. Lu

(57) ABSTRACT

Process for manufacturing of an optical article which comprises:
  making available an organic substrate based on an organic polymer having a degree of water uptake of greater than or equal to 0.6% by weight, with respect to the total weight of the substrate, the degree of water uptake being equal to the weight of water absorbed by the material after drying and then storing for 800 hours in a chamber at 50° C. under a relative humidity of 100% and at atmospheric pressure;
  forming a hard abrasion-resistant coating on the substrate by heating the substrate at a temperature of greater than or equal to 90° C. for a period of time of at least 20 minutes;
  exposing the substrate covered with the hard abrasion-resistant coating to a humid atmosphere, so as to restore, to the organic substrate, the water evaporated during stage; and
  depositing of a water-impermeable inorganic coating by vacuum evaporation.

5 Claims, No Drawings

PROCESS FOR THE MANUFACTURE OF LENSES

RELATED APPLICATION

The present application is claiming the benefit of priority to French Patent Application No. FR 11 55179 filed on Jun. 14, 2011. The entire content of each of the aforementioned applications is incorporated herein by reference in its entirety.

The present invention relates to a process for the manufacture of optical articles comprising a water-impermeable inorganic coating deposited on a hard abrasion-resistant and scratch-resistant coating, the said process being characterized by a stage of conditioning the optical article in a humid atmosphere, after curing the abrasion-resistant coating and before deposition of the inorganic coating by vacuum evaporation.

The majority of ophthalmic lenses today comprise hard abrasion-resistant and scratch-resistant coatings. These hard coatings are generally deposited on an elastomeric primary layer, situated between the substrate and the hard coating and intended to improve the impact strength of the lenses.

In addition, it is known to treat ophthalmic lenses so as to prevent the formation of reflections annoying to the wearer or the person speaking to him. These antireflective coatings are generally composed of a multilayer stack with an alternation of inorganic layers having a high and a low refractive index deposited by vacuum evaporation. These antireflective coatings, in order to be effective, are, of course, deposited above the hard coatings.

During the development of new antireflective coatings also having antistatic properties contributed by an electroconductive layer based on indium tin oxide (ITO), the Applicant Company observed the gradual appearance of off-white and translucent cosmetic defects, in the form of points and lines extending over the entire surface of the lenses, which are visible under certain lighting conditions (arc lamp and with a strain tester).

Similar cosmetic defects have also been observed after the deposition of $TiO_2$-based inorganic layers having a high refractive index or also after deposition of an alumina-doped $SiO_2$-based inorganic coating having a low refractive index, for example sold by Merck under the name L5 or by Umicore under the name LIMA.

All these coatings appear to have the common feature of being deposited by vacuum evaporation and of being impermeable to water. The cosmetic defects as described above are not formed for water-permeable coatings, for example conventional antireflective coatings based on $ZrO_2$ and $SiO_2$.

The conditions for the appearance of these cosmetic defects and their mechanism of formation were, however, difficult to understand and a great deal of time and a considerable research effort were necessary in order to identify all the parameters involved in the formation of the defects, to put forward various hypotheses relating to the physicochemical mechanisms involved in this formation, to test these hypotheses and to provide and test different solutions in order to attempt to prevent these cosmetic defects.

The Applicant Company had in particular found that the defects were only present for certain organic substrates but not on others: only the organic substrates having a degree of affinity for water (high degree of water uptake after dehydration) and in which the water diffuses slowly gave rise to the defects in question.

Furthermore, the cosmetic defects generally were not present in the absence of underlying abrasion-resistant or impact-resistant hard coatings.

The conditions for the manufacture of the coatings also appeared to have an effect on the existence and scale of the cosmetic defects.

Numerous tests finally made it possible to understand that the cosmetic defects were due to a slow and non-uniform rehydration of hydrophilic substrates which had previously been dehydrated during certain prior stages of formation of the coatings.

The tests also made it possible to understand that the dehydration of the organic substrate resulting in this slow and non-uniform rehydration had taken place not during the deposition of the antireflective inorganic coatings by vacuum evaporation, as had initially been believed, but during the stage of hot curing of the abrasion-resistant or impact-resistant coating which preceded the deposition of the inorganic coating by vacuum evaporation.

It was only after identification of all of the parameters and mechanisms described above that the Applicant Company was able to provide a solution, in fact a fairly simple one, to the problem represented by these cosmetic defects. This solution consists in uniformly rehydrating, over the whole of its surface, the lens which had been subjected to the stage of hot curing of the abrasion-resistant coating, before carrying out the deposition of the water-impermeable inorganic coating by vacuum evaporation. Fears that vacuum deposition would again desorb the water from the substrate proved to be unfounded and the process which is the subject-matter of the present invention thus makes it possible to provide a satisfactory solution to the problem of the gradual and non-uniform hydration of certain organic substrates covered both with a heat-cured abrasion-resistant coating and with a water-impermeable inorganic coating.

A subject-matter of the present invention is consequently a process for the manufacture of an optical article which comprises:

(a) making available an organic substrate based on an organic polymer having a degree of water uptake of greater than or equal to 0.6% by weight, with respect to the total weight of the said substrate, chosen from the group formed by acrylic and methacrylic homopolymers and copolymers, in particular poly(methyl methacrylate), thioacrylic and thiomethacrylic homopolymers and copolymers, polyvinylbutyral (PVB), polyurethanes, polythiourethanes, homopolymers and copolymers based on polyol allyl carbonates, thermoplastic ethylene/vinyl acetate (EVA) copolymers, polyesters, such as poly(ethylene terephthalate) and poly(butylene terephthalate), polyepoxides, polyamides, polycarbonate/polyester copolymers, cycloolefin copolymers, such as ethylene/norbonene or ethylene/cyclopentadiene copolymers, and the combinations of these polymers, the degree of water uptake being equal to the weight of water absorbed by the material after drying and then storing for 800 hours in a chamber at 50° C. under a relative humidity of 100% and at atmospheric pressure, (b) a stage of formation of a hard abrasion-resistant coating on the said organic substrate, this stage comprising the heating of the substrate at a temperature of greater than or equal to 90° C. for a period of time of at least 20 minutes, (c) a stage of exposure of the organic substrate covered with the hard abrasion-resistant coating to a humid atmosphere, so as to restore, to the organic substrate, the water evaporated during stage (b), (d) a stage of deposition of a water-impermeable inorganic coating by vacuum evaporation.

As explained in the introduction, the technical problem which the present invention intends to solve is present only for certain organic substrates, namely for hydrophilic substrates, i.e. having a degree of affinity for water characterized by a degree of water uptake, and in which the water diffuses only slowly.

The organic substrates for which this problem is particularly significant are organic glasses having a high refractive index sold by Mitsui Chemical Inc. under the names MR6, MR7, MR8 and MR10. All these materials are thermoset polythiourethanes and this family of polymers is consequently particularly preferred for the present invention.

The Applicant Company has found, during the tests which led to the present invention, that the phenomenon of slow rehydration was particularly significant for the substrates MR7 and MR8, in particular for the substrate MR8, which consequently constitutes a particularly preferred substrate for the implementation of the present invention.

In stage (b) of the process of the present invention, the organic substrate is coated with a hard abrasion-resistant coating known as such. It is preferably an abrasion-resistant coating of nanocomposite varnish type based on silica dispersed in an organic matrix. Such varnishes are described in detail, for example, in U.S. Pat. No. 5,619,288 and EP 0 614 957 and in International Application WO 02/00561. There should be noted, among the abrasion-resistant coatings employed in the context of the invention, coatings obtained from epoxyalkylalkoxysilanes, such as γ-glycidoxypropyltrimethoxysilane (GLYMO), and from alkylalkoxysilanes, such as dimethyldiethoxysilane (DMDES), or from hydrolysates of these compounds, and from a catalyst, such as aluminium acetylacetonate. Preferably, the abrasion-resistant coating also comprises a colloidal binder, such as a metal oxide or silica.

This abrasion-resistant coating can be applied according to the known processes, for example by spin coating, by dip coating, by bar coating or by spray coating.

The thickness of this abrasion-resistant coating is similar to that of the known abrasion-resistant coatings and is generally between 1 and 15 μm, preferably between 2 and 10 μm.

As indicated above, this formation of the abrasion-resistant coating necessarily comprises a stage of heating the coated organic substrate at a temperature at least equal to 90° C. for at least 20 minutes. It is during this heating stage that the dehydration of the organic substrate occurs. For significantly shorter heating times, the phenomenon of dehydration is not sufficiently great. In principle, there is no upper limit value for the heating time. However, the latter generally does not exceed approximately 4 hours and is preferably equal to approximately 3 hours.

Stage (b) of formation of the hard abrasion-resistant coating can be preceded by a stage (b') of deposition of an elastomeric primer. This is a conventional treatment, well known to a person skilled in the art, having as main effect that of increasing the impact strength of optical articles. Appropriate primers are described, for example, in U.S. Pat. No. 6,858,305 and U.S. Pat. No. 7,357,503. This primer, deposited in the form of a liquid composition and then optionally crosslinked, absorbs not only the impact received by the abrasion-resistant varnish but also ensures that the abrasion-resistant varnish adheres well to the substrate. Its thickness is generally between 1 and approximately 20 μm.

The abrasion-resistant varnishes and the elastomeric primers optionally present are water-permeable layers; in other words, they have a barrier effect characterized by a $B_{24h}$ value, as defined below, of less than or equal to 0.1.

The essential stage which distinguishes the process according to the invention from the known processes is stage (c), namely a stage of hydration of the optical article, coated with the abrasion-resistant varnish and optionally with an underlying primer, in a humid atmosphere for a sufficient period of time to restore, to the organic substrate, the water evaporated during stage (b).

Tests have shown that the relative humidity during stage (c) had to be neither too great nor too low. Thus, a relative humidity of 90% or more did not always make it possible to obtain satisfactory results. For excessively low relative humidities, the exposure time necessary to obtain good results was excessively long. The relative humidity of the atmosphere during stage (c) is consequently preferably set at a value of between 50 and 80%, preferably between 50 and 75%.

Stage (c) does not necessarily require that the optical article be heated and can be carried out at ambient temperature (25° C.) or even at a temperature below ambient temperature. The Applicant Company has observed that the exposure of the optical articles for several days at a temperature of 20° C. made it possible to bring about the complete disappearance of the cosmetic defects.

Stage (c) is preferably carried out at a temperature of between 15 and 80° C., in particular between 20 and 75° C. and more preferably between 25 and 70° C.

The duration of stage (c) is preferably between 1 and 20 days, more preferably between 2 and 15 days and in particular between 4 and 12 days.

The hydrated substrates obtained on conclusion of stage (c) can be subjected directly to the deposition of an antireflective coating by vacuum evaporation or also they can be subjected to a surface treatment before the stage of vacuum deposition. As indicated in the introduction, the numerous tests carried out by the Applicant Company have made it possible to understand that the cosmetic defects were produced only when the stack deposited on the abrasion-resistant varnish was impermeable to water or comprised at least one water-impermeable layer.

"Water-impermeable layer or stack" is understood here to mean a layer or a stack of layers having a water barrier effect ($B_{24h}$) that is at least equal to 0.15, preferably at least equal to 0.2.

The water barrier effect ($B_{24h}$) is determined by comparing the rate of hydration of a bare substrate of an optical article, devoid of any coating, dried beforehand, with the rate of hydration of an optical article dried beforehand under the same conditions as the control article and then coated with an impermeable layer or with an impermeable stack of layers. The parameter $B_{24h}$ is obtained by the following formula:

$$B_{24h} = 1 - \frac{w}{w_{bare\ substrate}}$$

where
w=weight of water taken up by the sample during the 24 hours in an atmosphere at 50° C. and 100% humidity, and
$w_{bare\ substrate}$=weight of water taken up by the bare substrate under the same conditions.

The deposition of a water-impermeable antireflective inorganic coating (stage (d)), preferably comprising at least one layer evaporated from one of the following materials: $TiO_2$ or a substoichiometric titanium oxide compound ($TiO_x$ with x less than 2), ITO or indium oxide, or silica doped with alumina, can be carried out in a known way, for example according to the procedures described in FR 2943798 and FR 2913116.

EXAMPLE ACCORDING TO THE INVENTION

A thermosetting solution for an abrasion-resistant coating (comprising, with respect to the total weight of the composition, 22% of glycidoxypropylmethyldimethoxysilane, 62% of colloidal silica present at 30% in methanol, and 0.70% of aluminium acetylacetonate) is deposited by spin coating in a thickness of approximately 4 μm on organic glasses made of polythiourethane (MR8). This layer is subsequently subjected to crosslinking by heating at 100° C. for 3 hours. The thermosetting solution and the process for obtaining the abrasion-resistant coating are described in Example 3 of patent EP 0614957 B1.

The coated glasses are subsequently placed on grids in a climate-controlled chamber, where they are stored at a temperature of 60° C. under a relative humidity of 70% for 5 days.

After this hydration stage, the glasses are subjected to a vacuum treatment in a device sold under the name SATIS 1200 DLF by Satisloh. The stack deposited is a stack which comprises, as final layer, a layer of $SiO_2$ doped with alumina as described in applications FR 2913116 or FR 2903197.

The glasses are subsequently inspected with an arc lamp immediately after the treatment. No cosmetic defect is then observed. After storing for a week under ambient conditions, no cosmetic defect appears. Even steeping in water at ambient temperature for 24 hours does not bring about the appearance of cosmetic defects. It is the same for exposure of the lenses to a temperature of 40° C. for 4 days.

Identical results, that is to say the complete absence of cosmetic defects, are obtained on carrying out the hydration stage at 20° C. and at a relative humidity of 50% for 14 days.

When glasses are prepared according to the protocol described above but without the hydration stage in the climate-controlled chamber (5 days at a temperature of 60° C. under a relative humidity of 70%), cosmetic defects visible with an arc lamp or with a tensile testing device appear on the majority of the glasses after storing for a few days under ambient conditions (20° C., relative humidity approximately 50%).

The invention claimed is:

1. The process for the manufacture of an optical article, which comprises:
    making available an organic substrate based on an organic polymer having a degree of water uptake of greater than or equal to 0.6% by weight, with respect to the total weight of said substrate, chosen from the group formed by acrylic and methacrylic homopolymers and copoloymers, thioacrylic and thiomethacrylic homopolymers and copolymers, polyvinylbutyral (PVB), polyurethanes, polythiourethanes, homopolymers and copolymers based on polyol allyl carbonates, thermoplastic ethylene/vinyl acetate (EVA) copolymers, polyesters, polyepoxides, polyamides, polycarbonate/polyester copolymers, cycloolefin copolymers and the combinations of these polymers, the degree of water uptake being equal to the weight of water absorbed by the material after drying and then storing for 800 hours in a chamber of 50° C. under a relative humidity of 100% and at atmospheric pressure;
    a stage of formulation of a hard abrasion-resistant coating on said organic substrate, this stage comprising the heating of the substrate at a temperature of greater than or equal to 90° C. for a period of time of at least 20 minutes;
    a stage of exposure of the organic substrate covered with the hard abrasion-resistant coating to a humid atmosphere at a duration of between 1 and 20 days, so as to restore, to the organic substrate, the water evaporated during the formation stage; and
    a stage of deposition of a water-impermeable inorganic coating by vacuum evaporation.

2. The process according to claim 1, wherein the organic polymer is chosen from thermoset polythiourethanes.

3. The process according to claim 2, wherein the relative humidity of the humid atmosphere of the exposure stage is between 50 and 80%.

4. The process according to claim 1, wherein the relative humidity of the humid atmosphere of the exposure stage is between 50 and 80%.

5. The process according to claim 1, wherein the exposure stage is carried out at a temperature of between 15 and 80° C.

* * * * *